United States Patent [19]

Mixon, Jr.

[11] 4,059,333
[45] Nov. 22, 1977

[54] ELECTRICAL CONNECTOR

[75] Inventor: James Lenhart Mixon, Jr., Harrisburg, Pa.

[73] Assignee: AMP Incorporated, Harrisburg, Pa.

[21] Appl. No.: 756,949

[22] Filed: Jan. 5, 1977

[51] Int. Cl.² .............................................. H01R 7/06
[52] U.S. Cl. .................................. 339/247; 24/136 R; 403/211; 403/374
[58] Field of Search .................. 339/247, 248, 249 R, 339/249 A, 267, 270 R, 273; 24/134 N, 136 R, 136 B, 136 L, 171, 194; 403/211, 215, 374

[56] References Cited

U.S. PATENT DOCUMENTS

| 2,212,650 | 8/1940 | Rehfeld ................................ 403/211 |
| 2,534,970 | 12/1950 | Hausman ........................ 339/273 R |
| 3,349,167 | 10/1967 | Mixon, Jr. et al. .................. 339/247 |

Primary Examiner—Joseph H. McGlynn
Attorney, Agent, or Firm—Allan B. Osborne

[57] ABSTRACT

The present invention relates to a device for mechanically and electrically joining two cables. The device includes a wedge-shaped member and a C-member formed from resilient, spring wire.

1 Claim, 3 Drawing Figures

U.S. Patent  Nov. 22, 1977  4,059,333
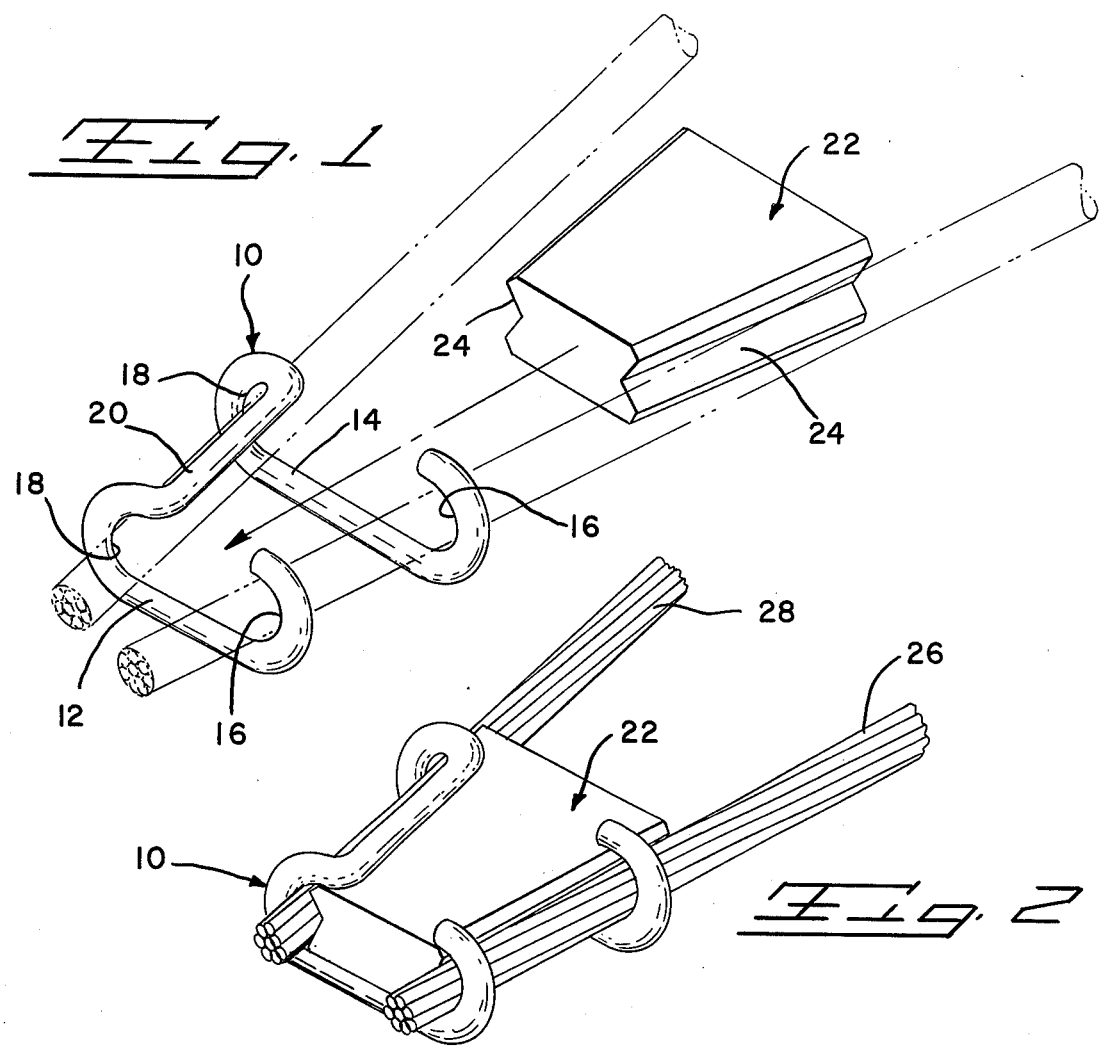
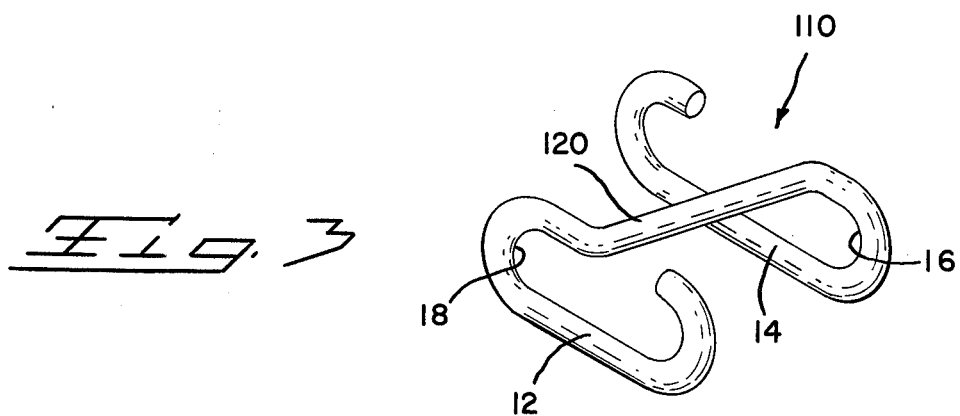

ELECTRICAL CONNECTOR

BACKGROUND OF THE INVENTION

Prior art devices of the type wherein two cables are joined by wedging them between a wedge member and a C-shaped member is exemplified by U.S. Pat. No. 3,349,167. The C-shaped member has a pair of bight sections, one at either end of a generally flat length of conductive metal. The member may be wider at one end. A conductor is laid along each section and a wedge shaped member driven into the C-shaped member to effect a mechanical and electrical connection with and between the cables.

An object of the present invention is to provide a C-shaped member of spring wire.

BRIEF DESCRIPTION OF THE DRAWINGS

FIG. 1 illustrates the novel C-shaped member of the present invention prior to its assembly with a wedge member and two electrical cables;

FIG. 2 illustrates the assembly of the members and cable of FIG. 1; and

FIG. 3 illustrates another embodiment of the C-shaped member of the present invention.

DESCRIPTION OF THE PRESENT INVENTION

The C-shaped member 10 shown in FIGS. 1 and 2 is formed from a length of very resilient spring steel. The member has a first and second sections 12 and 14 respectively. These sections are parallel one to the other with each having the ends thereof bent around into hooks 16 and 18; hooks 16 froming a cradle at one end of the two sections and hooks 18 forming a second cradle at the opposed end. Obviously the hook openings face inwardly so that each section has a C-shape. A piece of wire 20 extends from one hook 18 to the other to join the two sections 12 and 14 together.

Section 12 is shorter in length than section 14 so that the member has a tapered shape corresponding to the shape of wedge member 22 shown to the right in FIG. 1. The two sides 24 of the wedge are preferably grooved as shown. The wedge member is preferably made from copper or copper alloys.

In operation bare cables 26 and 28 are laid into the cradles fromed by hooks 16 and 18. This is illustrated in phantom in FIG. 1. Thereafter wedge member 22 is driven into the C-shaped member between the two cables in the manner shown in FIG. 2. The result is a mechanical retention and electrical connection of the cables.

FIG. 3 illustrates another embodiment of the present invention. In the embodiment, the connecting strap of wire 120 extends from a hook 16 on one section to hook 18 on the other section to form C-shaped member 110.

The foregoing detailed description has been given for clearness of understanding only, and no unnecessary limitations should be understood therefrom, as some modifications will be obvious to those skilled in the art.

What is claimed is:

1. An electrical connector for mechanically retaining and electrically connecting two cables, comprising:
   a. a wedge member of conductive material having beveled sides converging toward one end; and
   b. a member formed from a length of resilient spring wire having two spaced apart, parallel sections one shorter than the other, said sections being joined together by a length of said wire, the ends of each section being formed into inwardly facing hooks, whereby upon cradling cables in parallel hooks and driving the wedge member inbetween, said cables are mechanically retained and electrically connected.

* * * * *